US011436347B2

(12) United States Patent
Natarajan et al.

(10) Patent No.: US 11,436,347 B2
(45) Date of Patent: Sep. 6, 2022

(54) METHODS AND SYSTEMS FOR DYNAMIC SAMPLING OF APPLICATION EVENTS

(71) Applicant: META PLATFORMS, INC., Menlo Park, CA (US)

(72) Inventors: Ramkumar Natarajan, Redmond, WA (US); Yibo Cai, Mercer Island, WA (US); Lisa Jones, Seattle, WA (US)

(73) Assignee: META PLATFORMS, INC., Menlo Park, CA (US)

( * ) Notice: Subject to any disclaimer, the term of this patent is extended or adjusted under 35 U.S.C. 154(b) by 1275 days.

(21) Appl. No.: 15/432,753

(22) Filed: Feb. 14, 2017

(65) Prior Publication Data

US 2018/0232431 A1   Aug. 16, 2018

(51) Int. Cl.
*G06F 7/00*  (2006.01)
*G06F 21/60* (2013.01)
*G06F 16/26* (2019.01)

(52) U.S. Cl.
CPC ............ *G06F 21/604* (2013.01); *G06F 16/26* (2019.01)

(58) Field of Classification Search
CPC ........... G06Q 30/0273; G06Q 30/0603; G06Q 30/0277; G06F 21/604; G06F 16/26; G06F 16/211

USPC ............... 707/603, 706, 736, 999.1, 999.003
See application file for complete search history.

(56) References Cited

U.S. PATENT DOCUMENTS

| | | | | |
|---|---|---|---|---|
| 2010/0114714 A1* | 5/2010 | Vitek | ..................... | G06Q 30/00 705/14.69 |
| 2012/0143694 A1* | 6/2012 | Zargahi | .............. | G06Q 30/0603 705/14.66 |
| 2016/0360382 A1* | 12/2016 | Gross | .................... | G06F 3/0488 |

* cited by examiner

*Primary Examiner* — Md I Uddin
(74) *Attorney, Agent, or Firm* — Morgan, Lewis & Bockius LLP

(57) ABSTRACT

A method of dynamically sampling application events includes receiving usage data for a plurality of applications on client devices. The usage data includes data for instances of events that occur in the plurality of applications in response to users interacting with the plurality of applications on the client devices. The method further includes storing the usage data in a first data store, determining, for respective applications of the plurality of applications, sampling rates for respective application events of the plurality of application events based at least in part on respective quantities of instances of the respective application events during a period of time, sampling from the first data store the data for the instances of the respective application events at the sampling rates to form respective sets of usage data, and providing a report using one or more sets of the sets of usage data.

20 Claims, 7 Drawing Sheets

METHODS AND SYSTEMS FOR DYNAMIC SAMPLING OF APPLICATION EVENTS

TECHNICAL FIELD

This relates generally to data sampling, including but not limited to dynamically sampling of application events.

BACKGROUND

Software applications generate large volumes of data providing valuable insights into user behavior within the software applications themselves. However, the sheer volume of data generated by software applications can be overwhelming, even to data-analyzing computer programs. Consequently, interested parties (e.g., online service providers, advertisers, etc.) may benefit from processes that effectively use computer capabilities to analyze large volumes of data generated by users interacting with software applications.

SUMMARY

Accordingly, there is a need for methods and systems that can effectively analyze (e.g., organize and extract useful statistics from) large volumes of data generated by users interacting with software applications.

In accordance with some embodiments, a method is performed at a server system having one or more processors and memory storing instructions for execution by the processors. The method includes receiving usage data for a plurality of applications on client devices. The usage data includes data for instances of each of a plurality of application events that occur in the plurality of applications in response to users interacting with the plurality of applications on the client devices. The method further includes storing the usage data in a first data store; determining, for respective applications of the plurality of applications, sampling rates for respective application events of the plurality of application events based at least in part on respective quantities of instances of the respective application events during a period of time; and sampling from the first data store the data for the instances of the respective application events at the sampling rates to form respective sets of usage data. Each set of usage data includes data samples corresponding to distinct instances of a respective application event. The method also includes storing the sets of usage data in a second data store and providing a report using one or more sets of the sets of usage data.

In accordance with some embodiments, a server system includes one or more processors/cores and memory storing one or more programs configured to be executed by the one or more processors/cores. The one or more programs include instructions for performing the operations of the method described above. In accordance with some embodiments, a non-transitory computer-readable storage medium has stored therein instructions that when executed by one or more processors/cores of a server system, cause the server system to perform the operations of the method described above.

These dynamic sampling techniques provide a server system with processes to effectively retrieve statistics from the large volumes of data.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures and specification.

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first sampling rate could be termed a second sampling rate, and, similarly, a second sampling rate could be termed a first sampling rate, without departing from the scope of the various described embodiments. The first sampling rate and the second sampling rate are both sampling rates, but they are not the same sampling rate unless specified otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

As used herein, the term "exemplary" is used in the sense of "serving as an example, instance, or illustration" and not in the sense of "representing the best of its kind."

Figure 1:
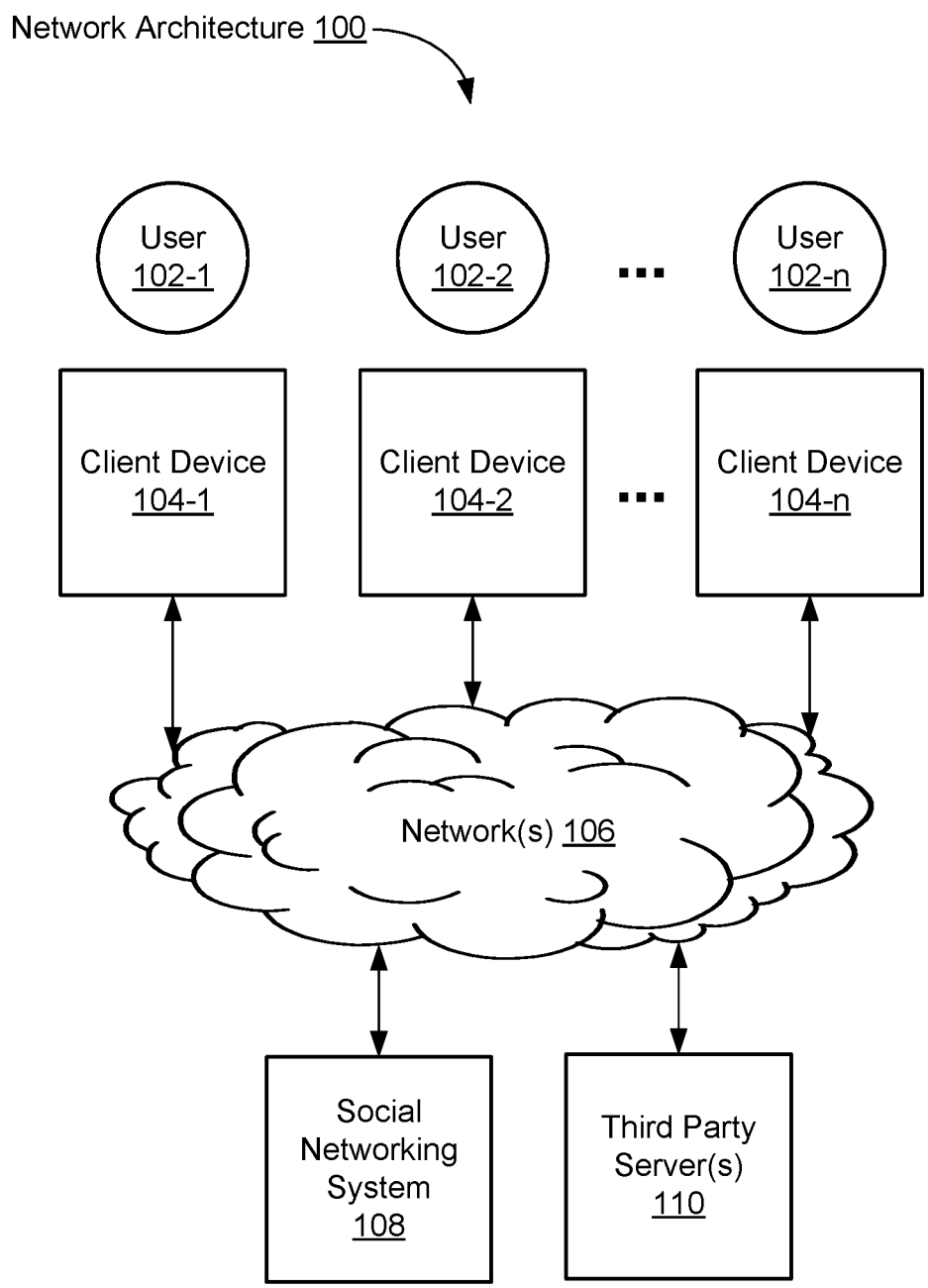
FIG. 1 is a block diagram illustrating an exemplary network architecture, in accordance with some embodiments.

FIG. 1 is a block diagram illustrating an exemplary network architecture in accordance with some embodiments. The network architecture 100 includes a number of client devices 104-1, 104-2, . . . 104-n communicably connected to a social networking system 108 by one or more networks 106.

In some embodiments, the client devices 104-1, 104-2, . . . 104-n are computing devices such as smart watches, personal digital assistants, portable media players, smart phones, tablet computers, 2D gaming devices, 3D gaming devices, virtual reality devices, laptop computers, desktop computers, televisions with one or more processors embedded therein or coupled thereto, in-vehicle information systems (e.g., an in-car computer system that provides navigation, entertainment, and/or other information), or other appropriate computing devices that can be used to communicate with an electronic social networking system 108 and other computing devices (e.g., via the social networking system). In some embodiments, the social networking system 108 is a single computing device such as a computer server, while in other embodiments, the social networking system 108 is implemented by multiple computing devices working together to perform the actions of a server system (e.g., cloud computing). In some embodiments, the network 106 is a public communication network (e.g., the Internet or a cellular data network), a private communications network (e.g., private LAN or leased lines), or a combination of such communication networks.

Users 102-1, 102-2, . . . 102-n employ the client devices 104-1, 104-2, . . . 104-n to execute software applications (e.g., "apps") that are specific to third-party servers 110 and/or the social networking system 108. When employing the client devices 104 to execute software applications, users 102 generate usage data (e.g., application events) by interacting with features (e.g., selecting affordances, swiping in particular directions, etc.) displayed in the software applications. The various software applications may involve numerous distinct application events. For example, in a gaming application, a user may generate a first application event by completing a level within a game and may generate a second application event by obtaining a threshold score within the game. In another example, in a retail application, a user may generate a first application event by adding an item to his or her virtual shopping cart and may generate a second application event by paying or failing to complete payment for the item in the virtual shopping cart. In another example, in a sports application, a user may generate an application event by adding a player to his or her fantasy sports team. In addition, users may generate application events by installing an application, uninstalling an application, launching an application, and the like.

In some embodiments, the network architecture 100 also includes one or more third-party servers 110. In some embodiments, third-party servers 110 are associated with third-party service providers who provide services and/or features to users of a network (e.g., users of the social networking system 108, FIG. 1). In some embodiments, a given third-party server 110 is used to host third-party software applications that are used by client devices 104, either directly with, in conjunction with, or independently of the social networking system 108 (e.g., the gaming, retail, and/or sports applications discussed above). For example, an application executing on a client device 104 may communicate information, via the client device 104, regarding activity (e.g., application events) in the application to the third-party server 110. The third-party server 110 may in turn communicate the information to the social networking system 108. Alternatively, in some embodiments, the client device 104 communicates the information directly to the social networking system 108. One skilled in the art will appreciate that various techniques may be used to gather information regarding activity in an application executing on a client device.

Figure 2:
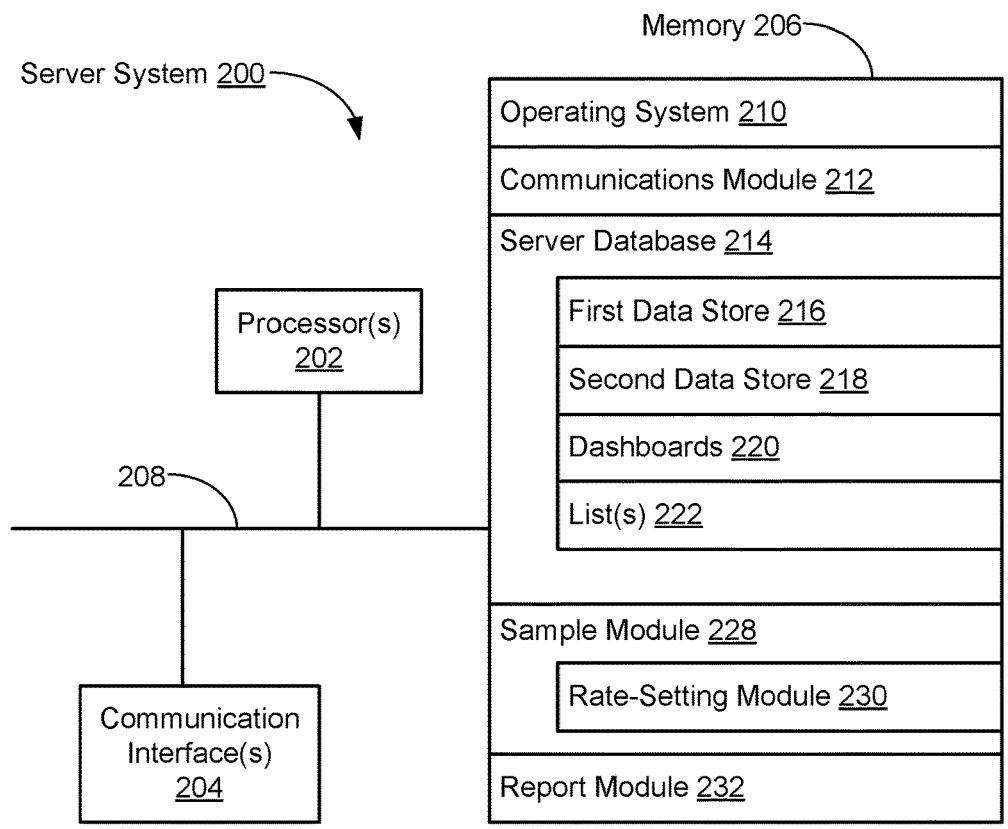
FIG. 2 is a block diagram illustrating an exemplary server system, in accordance with some embodiments.

FIG. 2 is a block diagram illustrating an exemplary server system 200 in accordance with some embodiments. In some embodiments, the server system 200 is an example of the social networking system 108 (FIG. 1). The server system 200 typically includes one or more processing units (processors or cores) 202, one or more network or other communications interfaces 204, memory 206, and one or more communication buses 208 for interconnecting these components. The communication buses 208 optionally include circuitry (sometimes called a chipset) that interconnects and controls communications between system components. The server system 200 optionally includes a user interface (not shown). The user interface, if provided, may include a display device and optionally includes inputs such as a keyboard, mouse, trackpad, and/or input buttons. Alternatively or in addition, the display device includes a touch-sensitive surface, in which case the display is a touch-sensitive display.

Memory 206 includes high-speed random access memory, such as DRAM, SRAM, DDR RAM, or other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from the processor(s) 202. Memory 206, or alternately the non-volatile memory device(s) within memory 206, includes a non-transitory computer readable storage medium. In some embodiments, memory 206 or the computer readable storage medium of memory 206 stores the following programs, modules, and data structures, or a subset or superset thereof:

- an operating system 210 that includes procedures for handling various basic system services and for performing hardware dependent tasks;
- a network communication module 212 that is used for connecting server system 200 to other computers (e.g., client devices 104-1, 104-2, . . . 104-n, and/or third party server(s) 110) via the one or more communication network interfaces 204 (wired or wireless) and one or more communication networks, such as the Internet, cellular telephone networks, mobile data networks, other wide area networks, local area networks, metropolitan area networks, and so on;
- a server database 214 for storing data associated with the server system 200, such as:
  a first data store 216;
  a second data store 218;
  dashboards 220; and
  one or more lists 222.
- a sample module 228 for sampling application events stored in the first and/or second data stores 216 and 218 using one or more sampling rates; and
- a report module 230 for providing a report associated with usage data.

The server database 214 stores data (e.g., usage data received from a plurality of applications) in one or more types of databases, such as text, graph, dimensional, flat, hierarchical, network, object-oriented, relational, and/or XML databases.

The first data store 216 stores usage data for a plurality of applications installed on client devices. In some embodiments, the usage data is received from the client devices (e.g., client devices 104-1 through 104-n, FIG. 1). Alternatively or in addition, in some embodiments, the usage data is received from one or more third-party servers (e.g., third-party server(s) 110, FIG. 1) that collect the usage data from client devices. In some embodiments, the usage data includes application events that occur in the plurality of applications in response to users interacting with the plurality of applications on the client devices (e.g., user 102-1 interacting with (e.g., touching, clicking, swiping, playing, etc.) an application executing on the client device 104-1, FIG. 1).

The second data store 218 stores sets of usage data sampled from the usage data stored in the first data store 216. Each set of usage data includes data samples corresponding to distinct instances of a respective application event (e.g., a first set of usage data includes instances of Event A in Application A, a second set of usage data includes instances of Event B in Application A, a third set of usage data includes instances of Event A in Application B, and so on).

The usage data stored in the first data store 216 are sampled at specified sampling rates to form the sets of usage data. In some embodiments, each application event has a distinct sampling rate (e.g., Event A in Application A has a first sampling rate, Event B in Application A has a second sampling rate, and so on). In some embodiments, sampling rates (e.g., the first sampling rate) may be based at least in part on respective quantities of instances of respective application events during a period of time (e.g., a plurality of days such as a week, two weeks, etc.).

In some embodiments, thresholds are used to limit (e.g., cap) an amount of samples (e.g., quantity of instances) gathered for a respective set of usage data. In this way, limits are placed on volumes of usage data stored in the second data store 218 for the respective sets of usage data.

In some embodiments, the one or more lists 222 include a whitelist of events. The server system 200 may store usage data for each instance of an application event on the whitelist in the second data store 218. For example, application installs or application uninstalls may be application events on the whitelist of events. In some embodiments, the one or more lists 222 include identified users. For example, the server system 200 may identify a user associated with an instance of an application event for an application and log the identified user in one of the one or more lists 222. Identifying users is discussed in further detail below with reference to method 300.

Figures 4, 5:
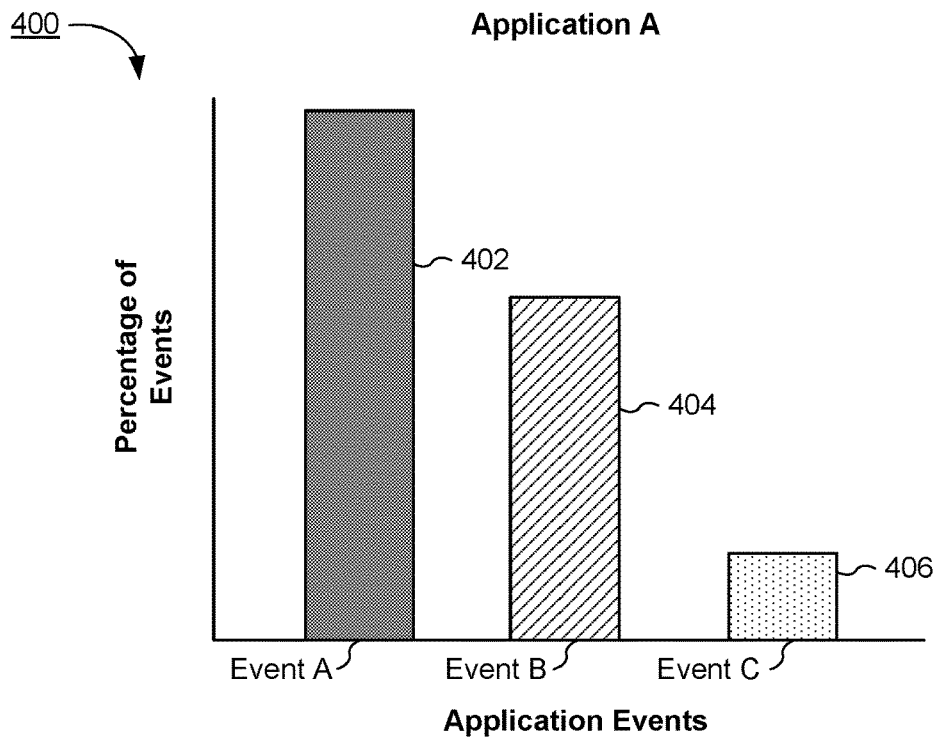
FIG. 4 is an illustration of a report provided by the server system, in accordance with some embodiments.
FIG. 5 is an illustration of a report provided by the server system, in accordance with some embodiments.

The dashboards 220 are interfaces that organize and present information in a way that is easy to read and understand. The dashboards 220 include multiple interfaces that may be used to present information. One example of a dashboard is illustrated by report 400 (FIG. 4), which shows numbers of instances of specific events 402, 404, 406 as percentages of all events for an application. Another example of a dashboard is illustrated by report 500 (FIG. 5).

In some embodiments, the sample module 228 includes a rate-setting module 230. The rate-setting module 230 is used for adjusting the sampling rates based on changes in received usage data (e.g., changes in rates of receiving usage data).

FIGS. 3A-3F are flow diagrams illustrating a method 300 for dynamic sampling of application events, in accordance with some embodiments. The steps of the method 300 (including methods 338, 344, 358, 366, and/or 378, FIGS. 3C-3F) may be performed by a server system (e.g., social networking system 108, FIG. 1; server system 200, FIG. 2). FIGS. 3A-3F correspond to instructions stored in a computer memory or computer-readable storage medium (e.g., memory 206 of the server system 200, FIG. 2). For example, the operations of the method 300 are performed, at least in part, by the sample module 228 (FIG. 2) and the report module 232 (FIG. 2). To assist with describing the method 300, the method 300 will be described with reference to FIG. 4 and FIG. 5.

In performing the method 300, the server system receives (302) usage data for a plurality of applications on client devices (e.g., client devices 104-1, 104-2, . . . 104-n, FIG. 1). The usage data includes data for instances of each of a plurality of application events that occur in the plurality of applications in response to users interacting with the plurality of applications on the client devices. For example, a user interacting with Application A may launch (e.g., Event A) Application A x-number of times (e.g., x-number of instances) and may select an affordance (e.g., Event B) displayed in Application A y-number of times (e.g., y-number of instances). In response to the user interactions, Application A may provide the server system with usage data for the x-number of instances and the y-number of instances. In some embodiments, the usage data further includes application identification, client type (e.g., iOS, Android, etc.), application version, event timestamp, and the like. In some embodiments, a third-party server (e.g., third party server 110, FIG. 10) receives the usage data from the client device and provides the usage data to the server system.

The server system stores (304) the usage data in a first data store (e.g., first data store 216, FIG. 2). For example, the server system stores data for the x-number of instances of Event A and the y-number of instances of Event B for Application A in the first data store 216.

The server system determines (306), for respective applications of the plurality of applications, sampling rates for respective application events of the plurality of application events based at least in part on respective quantities of instances of the respective application events during a first period of time (e.g., a plurality of days). For example, a quantity of instances of Event B of Application A during the first period of time is the y-number of instances. As such, the server system may base the sampling rate for Event B at least in part on the y-number of instances. The server system may determine unique sampling rates for each application event occurring in each respective application of the plurality of applications. For example, referring to FIG. 4, the server system determines, for Application A, a first sampling rate for Event A 402 (e.g., application launch), a second sampling rate for Event B 404 (e.g., selection of affordance), a third sampling rate for Event C 406, and so on. The server system may determine, for other applications (e.g., Application B, Application C, and so on), a first sample rate for Event A of each application, a second sampling rate for Event B of each application, and so on.

In some embodiments, when determining the sampling rate for a respective application event, the server system determines (308) daily counts (or counts during another specified time period) of instances of the respective application event for which data are received. For example, the server system determines daily counts of instances for each day of a plurality of days (e.g., a week). Furthermore, the server system calculates (310) a statistic based on the daily counts. For example, the statistic is a median value of daily counts (312). Alternatively, in some embodiments, the statistic is a mode of daily counts, a mean of daily counts, a specified number of standard deviations from the mean of daily counts, a specified percentile of daily counts, or the like. The server system uses (314) the statistic to select the sampling rate. For example, referring to Event B and the y-number of instances, the server system uses the median value of daily counts of the y-number of instances as the statistic when determining the sampling rate for Event B.

The server system samples (316), from the first data store, the data for the instances of the respective application events at the sampling rates (also referred to herein as data-store sampling rates) to form respective sets of usage data. Each set of usage data includes data samples corresponding to distinct instances of a respective application event. For example, the server system may sample from usage data for the x-number of instances associated with Event A of Application A at the first sampling rate to form a first set of usage data and may sample from usage data for the y-number of instances associated with Event B of Application A at the second sampling rate to form a second set of usage data. In some embodiments, the first and second sampling rates are the same rate (e.g., coincidentally). In some embodiments, the first and second sampling rates are different rates.

The server system stores (318) the sets of usage data in a second data store (e.g., second data store 218, FIG. 2).

The server system provides (320, FIG. 3B) a report (e.g., report 400, FIG. 4; report 500, FIG. 5) using one or more sets of the sets of usage data. For example, referring to FIG. 5, report 500 includes an event column 502, and sample period of time column 504 (e.g., the first period of time), and a description column 506 which includes a description (e.g., facts, statistics, etc.) of user activity in Application A during the sample period of time (e.g., the first period of time). As shown for Event B, the report (e.g., description column 506) includes one or more relevant facts such as a demographic statistic (e.g., 25% of users invoking Event B during the sample period of time were female), a peak usage statistic (e.g., users invoking Event B peaks on Jan. 19, 2016 from 4:00 pm to 6:30 pm), and an achievement statistic (e.g., 85% of users of Application A did not proceed to Event C after invoking Event B). The description column 506 of the report 500 is merely illustrative and one skilled in the art will appreciate that any number of descriptors could be included in the report 500 in any format, depending on the application (e.g., retail application may include a first set of descriptors in the description column 506 and a sports applications may include a second set of descriptors in the description column 506).

In some embodiments, to provide (320) the report, the server system samples (322) a first set of the one or more sets of usage data from the second data store at a query sampling rate to form a subset of the first set. In this way, the server system may sample usage data from the first data store at the data-store sampling rates and may further sample the sets of usage data from the second data store at the query sampling rate. For example, referring to Event B of Application A, the server system may sample usage data associated with Event B from the first data store at a data-store sampling rate for Event B to form a set of usage data associated with Event B. The server system may further sample the set of usage data associated with Event B at a query sampling rate to form the subset. In addition, the server system may generate (324) the report (e.g., report 500, FIG. 5) using the subset (e.g., a first subset).

In some embodiments, the server system further samples a second set of the one or more sets from the second data store at another query sampling rate to form a second subset of the second set (e.g., Event C of Application A). The server system may generate the report using the second subset either alone or in combination with the first subset. In some embodiments, the server system may generate the report using one or more subsets (or sets) of usage data from each of a plurality of applications.

In some embodiments, a product of the query sampling rate and the data-store sampling rate for an application event that corresponds to a first set of usage data equals a predefined overall sampling rate. For example, the server system detects a change in the rate at which data for instances of the first application event are received (e.g., users of Application A may invoke Event B at a reduced rate). In response to detecting the change, the server system may change a first data-store sampling rate inversely with the change in the rate at which data for instances of the first application event are received. For example, in if users invoke an application event at a reduced (or increased) rate, the server system may increase (or decrease) the first data-store sampling rate accordingly. Furthermore, the server system changes the query sampling rate in accordance with the change to the first data-store sampling rate, to maintain the overall sampling rate. For example, the server system may increase (or decrease) the first data-store sampling rate and proportionally decrease (or increase) the query sampling rate so that the product of the query sampling rate and the data-store sampling rate for the application event (e.g., Event B of Application A) continues to equal the predefined overall sampling rate.

In some embodiments, to provide (320) the report using the one or more sets of the sets of usage data (and/or the one or more subsets), the server system generates (326) a dashboard showing information characterizing the one or more sets (and/or the one or more subsets). The reports 400 (FIG. 4) and 500 (FIG. 5) are examples of a dashboard.

In some embodiments, the server system maintains a whitelist of application events (e.g., maintained in one of the lists 222, FIG. 2) and stores, in the second data store, all received data for instances of the application events on the whitelist. In some embodiments, application launches, installs, and/or uninstalls are included in the whitelist. For example, Event A is associated with launching Application A and is included on the whitelist. In some embodiments, the server system designates application events to be included in the whitelist. Alternatively or in addition, a third party designates application events to be included in the whitelist. Accordingly, to provide (320) the report using one or more sets of the sets of usage data, the server system generates (328) the report using the data in the second data store for all instances of an application event on the whitelist.

In some embodiments, the server system determines (330), for the respective applications of the plurality of applications, updated sampling rates for the respective application events of the plurality of application events based at least in part on respective quantities of instances of the respective application events during a second period of time that overlaps with the first period of time. For example, the first period of time may be a 7-day period and the second period of time may be another 7-day period that includes a number days included in the first period of time and a number of days not included in the first period of time. When determining the updated sampling rates, the server system may use some usage data received during the first period of time and some usage data received during the second period of time. In this way, the server system may determine trends in usage data between and within periods of time.

Furthermore, in some embodiments, the server system samples (332) usage data stored in the first data store during the second period of time at the updated sampling rates to update the respective sets of usage data and stores (334) the updated sets of usage data in the second data store. The server system may provide (336) another report using one or more sets of the updated sets of usage data. The sampling, storing, and providing steps 332, 334, and 336 are discussed in further detail above with reference to steps 316, 318, 320, respectively.

Figure 3A:
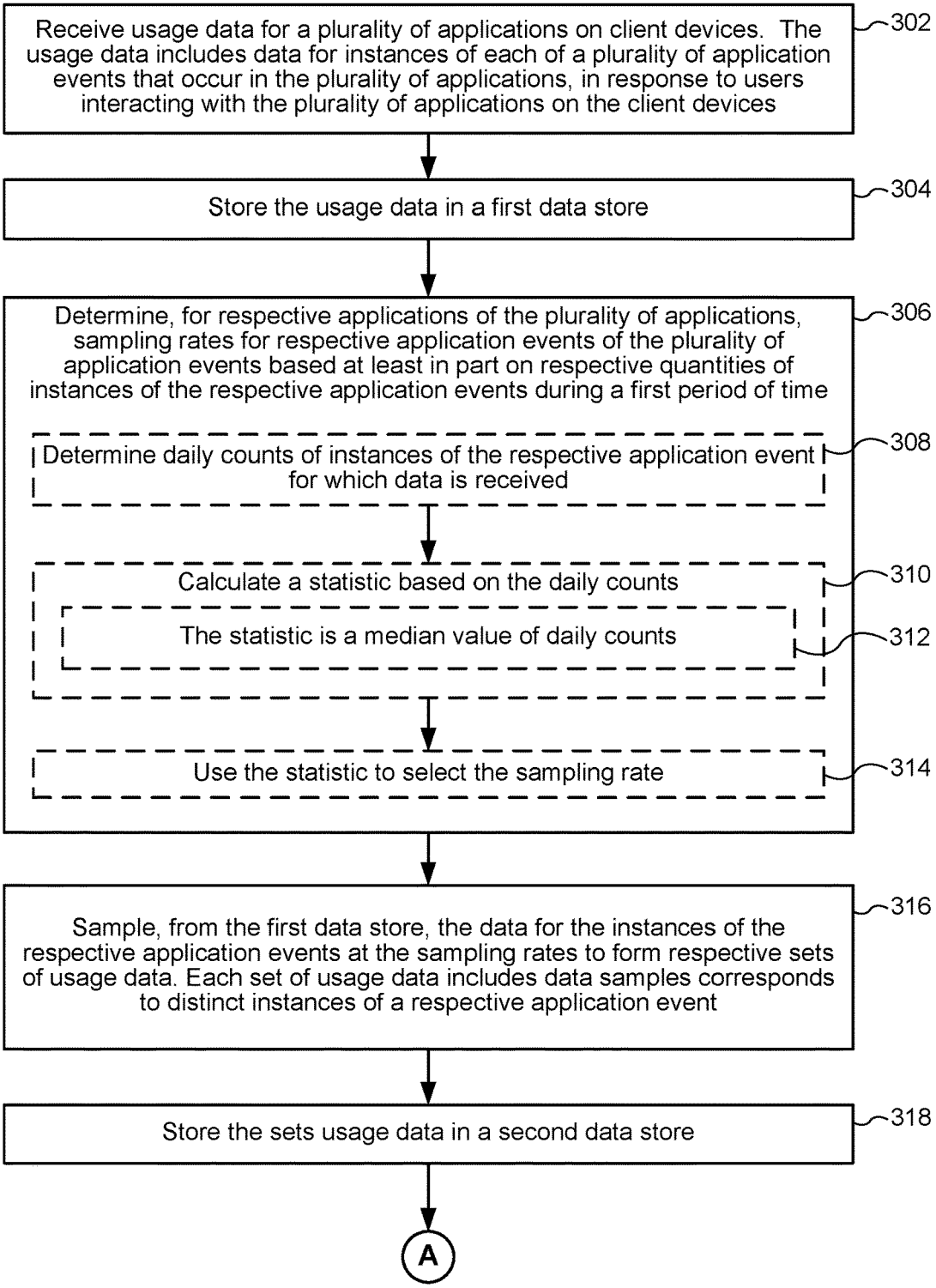
FIGS. 3A-3F are flow diagrams illustrating a method of dynamic sampling of application events, in accordance with some embodiments.
Figure 3B:
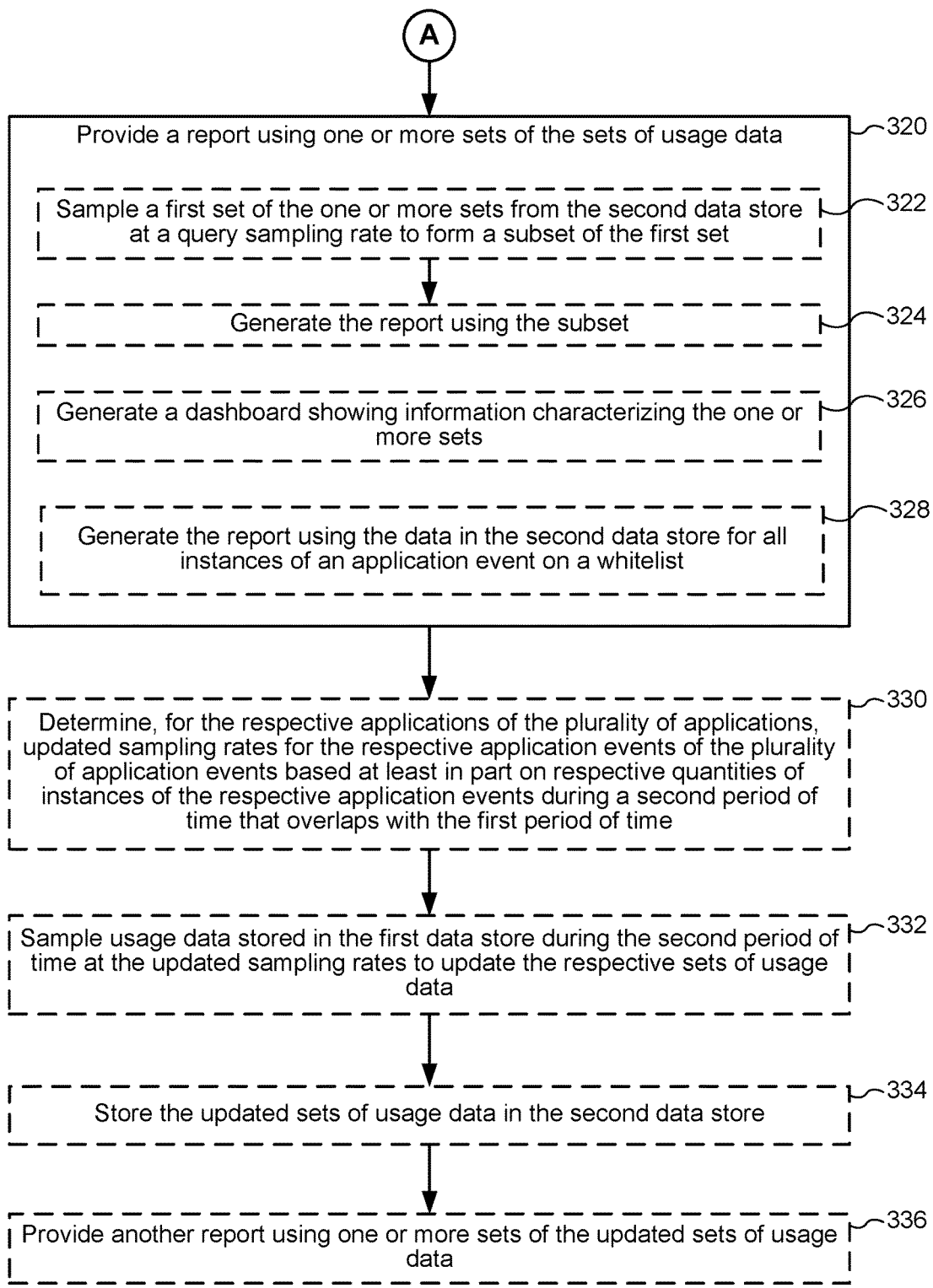
Figure 3C:
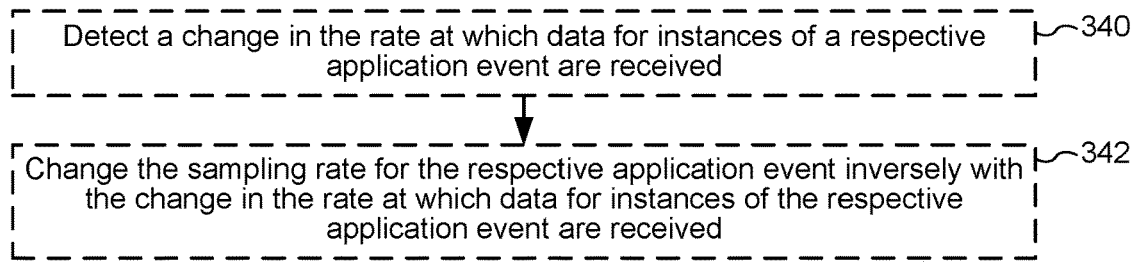

In some embodiments, the method 300 may include method 338 (FIG. 3C). The steps of the method 338 may be performed in conjunction with the steps of the method 300. For example, the steps of the method 338 may be performed between steps 306 and 316 of the method 300.

In performing the method 338, the server system detects (340) a change in the rate at which data (i.e., usage data) for instances of a respective application event are received. For example, users of Application A may invoke Event B at a lesser rate as a period of time progresses. Accordingly, the server system may detect the change in the rate at which data for instances of Event B are received.

In response to detecting the change in the rate, the server system changes (342) the sampling rate for the respective application event inversely with the change in the rate at which data for instances of the respective application event are received. For example, if the respective application event is invoked at a lesser (or greater) rate as the period of time progresses (e.g., data for fewer instances of Event B of Application A are received during a later portion of the period of time relative to data for an amount of instances of Event B received during an earlier portion of the period of time), the server system increases (or decreases) the sampling rate of the respective application event.

Figure 3D:
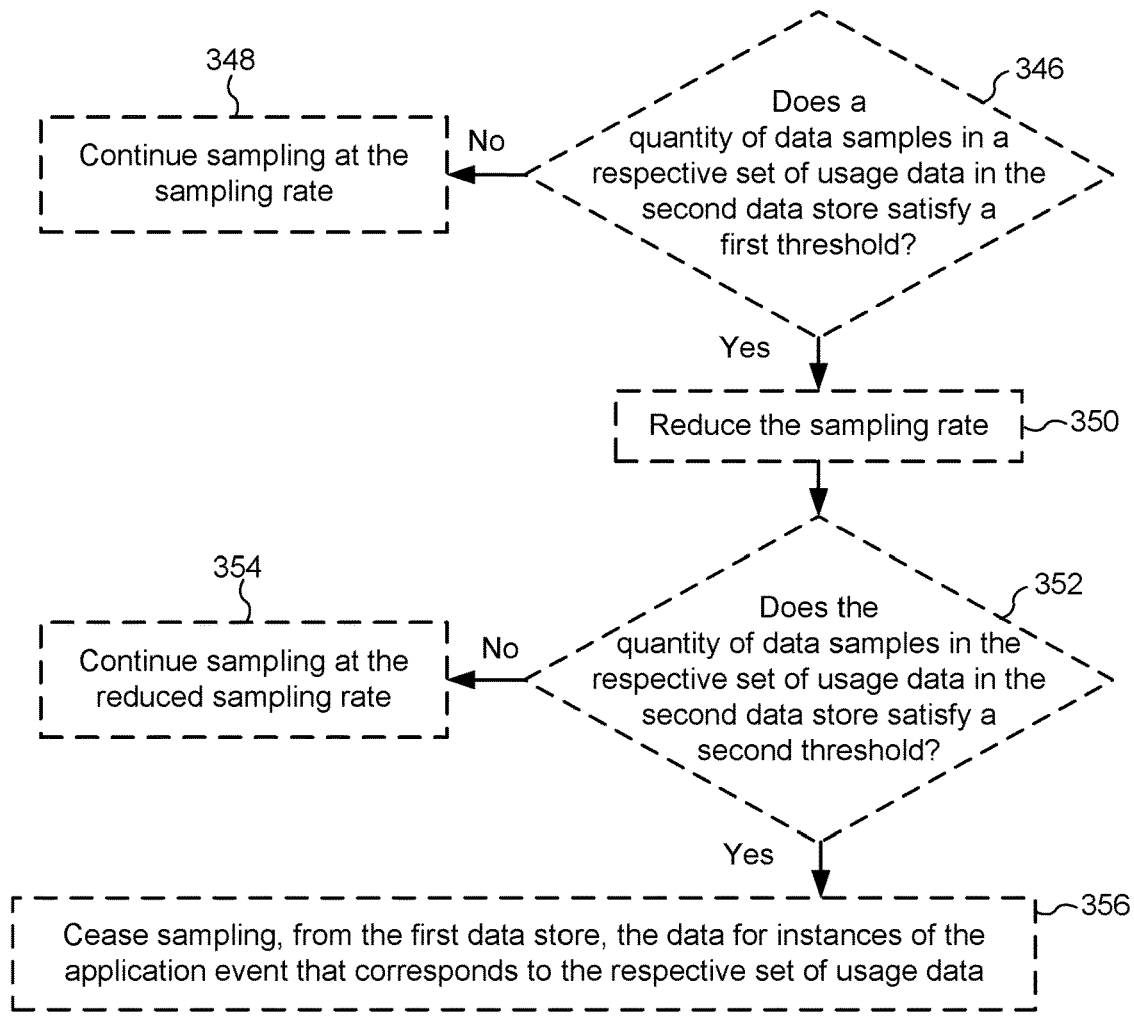

In some embodiments, the method 300 may include method 344 (FIG. 3D). The steps of the method 344 may be performed in conjunction with the steps of the method 300. For example, the steps of the method 344 may be performed during step 316 of the method 300.

In performing the method 344, the server system determines (346) whether a quantity of data samples in a respective set of usage data in the second data store satisfies (e.g., is greater than, or greater than or equal to) a first threshold. In some embodiments, the first threshold is specific to the respective set of usage data (e.g., specific to the set of usage data for Event B of Application A). In some embodiments, the first threshold is a buffer threshold. For example, the first threshold may be set to a value below a maximum threshold (e.g., set 20% below the maximum threshold).

If the quantity of data samples in the respective set of usage data in the second data store does not satisfy the first threshold (346—No), the server system continues (348) sampling at the sampling rate for the application event that corresponds to the respective set of usage data (e.g., continues sampling data for instances of Event B of Application A at the sampling rate for the set of usage data associated with Event B).

If the quantity of data samples in the respective set of usage data in the second data store satisfies the first threshold (346—Yes), the server system reduces (350) the sampling rate for the application event that corresponds to the respective set of usage data (e.g., continues sampling data for instances of Event B of Application A but does so at a reduced sampling rate for the set of usage data associated with Event B).

The server system may determine (352) whether the quantity of data samples in the respective set of usage data in the second data store satisfies (e.g., is greater than, or greater than or equal to) a second threshold greater than the first threshold. In some embodiments, the second threshold is a maximum threshold.

If the quantity of data samples in the respective set of usage data in the second data store does not satisfy the second threshold (352—No), the server system continues (354) sampling at the reduced sampling rate (e.g., continues sampling instances of Event B of Application A at the reduced sampling rate for the set of usage data associated with Event B).

If the quantity of data samples in the respective set of usage data in the second data store satisfies the second threshold (352—Yes), the server system ceases (356) sampling, from the first data store, the data for instances of the application event that corresponds to the respective set of usage data (e.g., stops sampling instances of Event B of Application A for the set of usage data associated with Event B).

Figure 3E:
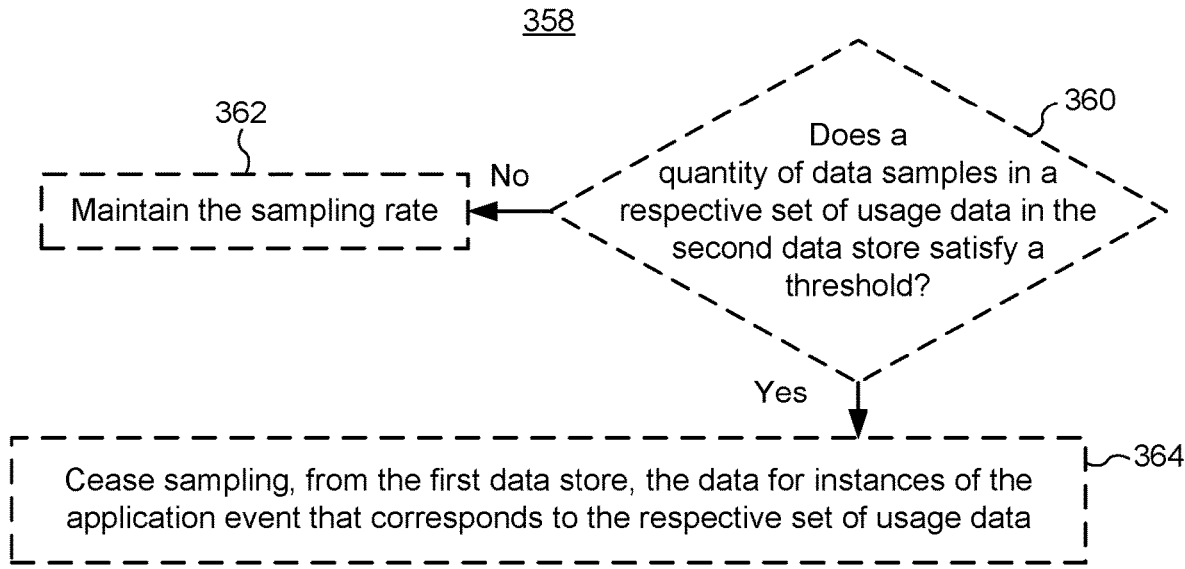

In some embodiments, the method 300 may include method 358 (FIG. 3E). The steps of the method 358 may be performed in conjunction with the steps of the method 300. For example, the steps of the method 358 may be performed during step 316 of the method 300.

In performing the method 358, the server system determines (360) whether a quantity of data samples in a respective set of usage data in the second data store satisfies (e.g., is greater than, or greater than or equal to) a threshold. In some embodiments, the threshold is a buffer threshold (e.g., set below a maximum threshold). In some embodiments, the threshold is a maximum threshold. If the quantity of data samples in the respective set of usage data in the second data store does not satisfy the threshold (360—No), the server system continues (362) sampling at the sampling rate for the application event that corresponds to the respective set of usage data (e.g., continues sampling instances of Event B of Application A at the sampling rate for the set of usage data associated with Event B).

If the quantity of data samples in the respective set of usage data in the second data store satisfies the threshold (360—Yes), the server system ceases (364) sampling, from the first data store, the data for instances of the application event that corresponds to the respective set of usage data (e.g., stops sampling instances of Event B of Application A for the set of usage data associated with Event B).

Figure 3F:
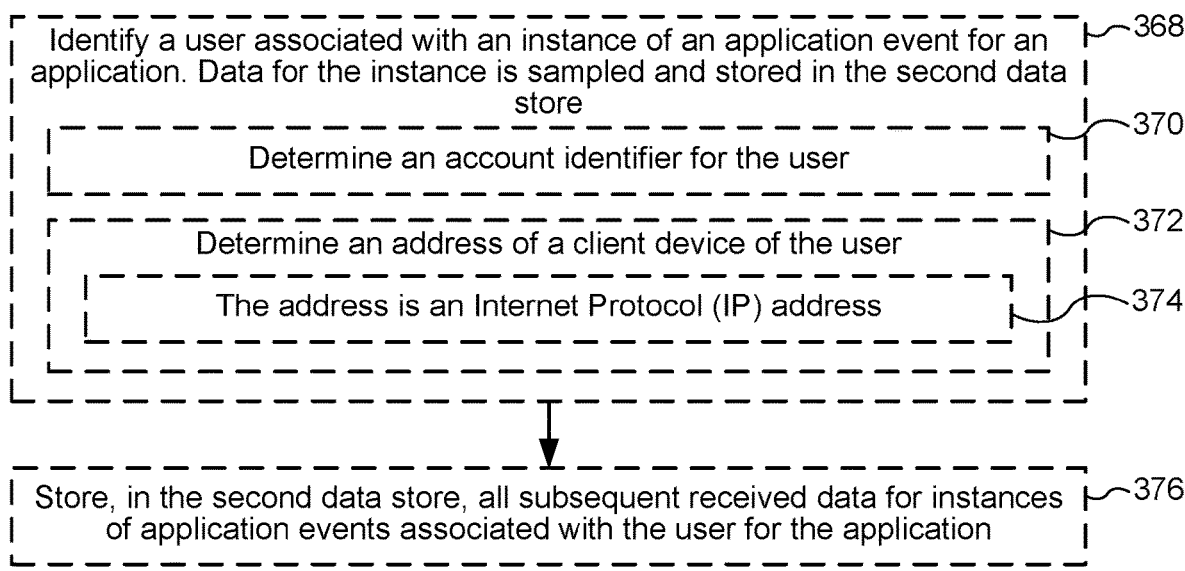

In some embodiments, the method 300 may include method 366 (FIG. 3F). The steps of the method 366 may be performed in conjunction with the steps of the method 300. For example, the steps of the method 366 may be performed after or during steps 302 and/or 304 of the method 300.

In performing the method 366, the server system identifies (368) a user associated with an instance of an application event for an application and stores data for the instance in the second data store as part of the sampling step 316 and storing step 318. In some embodiments, the server system, when identifying the user, selects the user at random after receiving an instance of an application event (e.g., Event B) associated with an application (e.g., Application A).

In some embodiments, to identify (368) the user, the server system determines (370) an account identifier of the user. For example, the account identifier of the user may be an account associated with a social networking service provided by the server system. Alternatively, the account identifier of the user may be associated with the respective application event (e.g., Event B may be an event for an application in which the user has an identifiable account).

In some embodiments, when identifying the user, the server system determines (372) an address of a client device of the user. For example, the address of the client device of the user may be an Internet Protocol (IP) address (374).

The server system stores (376), in the second data store, all subsequent received data for instances of application events associated with the user for the application (or for multiple applications, such as all monitored applications). Accordingly, the server system may track usage data for particular users (e.g., for a single application or across multiple applications).

Although some of various drawings illustrate a number of logical stages in a particular order, stages which are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method, comprising:
at a server system having one or more processors and memory storing instructions for execution by the one or more processors:
receiving usage data for a plurality of applications on client devices, wherein the usage data includes data for instances of each of a plurality of application events that occur in the plurality of applications, in response to users interacting with the plurality of applications on the client devices;
storing the usage data in a first data store;
determining, for respective applications of the plurality of applications, unique sampling rates for respective application events of the plurality of application events based at least in part on respective quantities of instances of the respective application events during a period of time;
after determining the unique sampling rates: sampling, from the first data store, the data for the instances of the respective application events at the unique sampling rates to form respective sets of usage data, wherein each set of usage data includes data samples corresponding to distinct instances of a respective application event;
storing the sets of usage data in a second data store; and
providing a report using one or more sets of the sets of usage data.

2. The method of claim 1, wherein the period of time is a first period of time and the method further comprises, at the server system:
determining, for the respective applications of the plurality of applications, updated unique sampling rates for the respective application events of the plurality of application events based at least in part on respective quantities of instances of the respective application events during a second period of time that overlaps with the first period of time;
after determining the updated unique sampling rates: sampling usage data stored in the first data store during the second period of time at the updated unique sampling rates to update the respective sets of usage data;
storing the updated sets of usage data in the second data store; and
providing another report using one or more sets of the updated sets of usage data.

3. The method of claim 1, wherein the unique sampling rates are data-store sampling rates and providing the report comprises:
sampling a first set of the one or more sets from the second data store at a query sampling rate to form a subset of the first set; and
generating the report using the subset.

4. The method of claim 3, wherein a product of the query sampling rate and the data-store sampling rate for the application event that corresponds to the first set equals a predefined overall sampling rate.

5. The method of claim 4, wherein the application event that corresponds to the first set is a first application event and the data-store sampling rate for the first application event is a first data-store sampling rate, the method further comprising, at the server system:
detecting a change in the rate at which data for instances of the first application event are received;
changing the first data-store sampling rate inversely with the change in the rate at which data for instances of the first application event are received; and
changing the query sampling rate in accordance with the change to the first data-store sampling rate, to maintain the overall sampling rate.

6. The method of claim 1, further comprising, at the server system:
detecting a change in the rate at which data for instances of a respective application event are received; and
changing the unique sampling rate for the respective application event inversely with the change in the rate at which data for instances of the respective application event are received.

7. The method of claim 1, further comprising, at the server system:
maintaining a whitelist of application events; and
storing, in the second data store, all received data for instances of the application events on the whitelist.

8. The method of claim 7, wherein providing the report comprises generating the report using the data in the second data store for all instances of an application event on the whitelist.

9. The method of claim 1, further comprising, at the server system:
identifying a user associated with an instance of an application event for an application, wherein data for the instance is sampled and stored in the second data store; and
in response to identifying the user, storing in the second data store all subsequent received data for instances of application events associated with the user for the application.

10. The method of claim 9, wherein identifying the user comprises determining an account identifier for the user.

11. The method of claim 9, wherein identifying the user comprises determining an address of a client device of the user.

12. The method of claim 11, wherein the address is an Internet Protocol (IP) address.

13. The method of claim 1, further comprising, at the server system:
  making a first determination that a quantity of data samples in a respective set of usage data in the second data store satisfies a first threshold; and
  in accordance with the first determination, reducing the unique sampling rate for the application event that corresponds to the respective set of usage data.

14. The method of claim 13, further comprising, at the server system:
  making a second determination that the quantity of data samples in the respective set of usage data in the second data store satisfies a second threshold, wherein the second threshold is greater than the first threshold; and
  in accordance with the second determination, ceasing to sample, from the first data store, the data for instances of the application event that corresponds to the respective set of usage data.

15. The method of claim 1, further comprising, at the server system:
  making a determination that a quantity of data samples in a respective set of usage data in the second data store satisfies a threshold; and
  in accordance with the determination, ceasing to sample, from the first data store, the data for instances of the application event that corresponds to the respective set of usage data.

16. The method of claim 1, wherein the period of time includes a plurality of days and determining the unique sampling rate for a respective application event comprises:
  determining daily counts of instances of the respective application event for which data is received;
  calculating a statistic based on the daily counts; and
  using the statistic to select the unique sampling rate.

17. The method of claim 16, wherein the statistic is a median value of the daily counts.

18. The method of claim 1, wherein providing the report comprises generating a dashboard showing information characterizing the one or more sets.

19. A server system, comprising:
  one or more processors; and
  memory storing one or more programs for execution by the one or more processors, the one or more programs including instructions for:
    receiving usage data for a plurality of applications on client devices, wherein the usage data includes data for instances of each of a plurality of application events that occur in the plurality of applications, in response to users interacting with the plurality of applications on the client devices;
    storing the usage data in a first data store;
    determining, for respective applications of the plurality of applications, unique sampling rates for respective application events of the plurality of application events based at least in part on respective quantities of instances of the respective application events during a period of time;
    after determining the unique sampling rates: sampling, from the first data store, the data for the instances of the respective application events at the unique sampling rates to form respective sets of usage data, wherein each set of usage data includes data samples corresponding to distinct instances of a respective application event;
    storing the sets of usage data in a second data store; and
    providing a report using one or more sets of the sets of usage data.

20. A non-transitory computer-readable storage medium, storing one or more programs configured for execution by one or more processors of a server system, the one or more programs including instructions, which when executed by the one or more processors cause the server system to:
  receive usage data for a plurality of applications on client devices, wherein the usage data includes data for instances of each of a plurality of application events that occur in the plurality of applications, in response to users interacting with the plurality of applications on the client devices;
  store the usage data in a first data store;
  determine, for respective applications of the plurality of applications, unique sampling rates for respective application events of the plurality of application events based at least in part on respective quantities of instances of the respective application events during a period of time;
  after determining the unique sampling rates: sample, from the first data store, the data for the instances of the respective application events at the unique sampling rates to form respective sets of usage data, wherein each set of usage data includes data samples corresponding to distinct instances of a respective application event;
  store the sets of usage data in a second data store; and
  provide a report using one or more sets of the sets of usage data.

* * * * *